US012762049B2

(12) United States Patent
Lin et al.

(10) Patent No.: US 12,762,049 B2
(45) Date of Patent: Oct. 13, 2026

(54) DATA STORAGE DEVICE AND CONTROL METHOD FOR NON-VOLATILE MEMORY

(71) Applicant: Silicon Motion, Inc., Jhubei City (TW)

(72) Inventors: Po-Yu Lin, Jinhu Township (TW); Jhih-Shun Yang, Taipei City (TW)

(73) Assignee: SILICON MOTION, INC., Jhubei City (TW)

( * ) Notice: Subject to any disclaimer, the term of this patent is extended or adjusted under 35 U.S.C. 154(b) by 0 days.

(21) Appl. No.: 18/906,503

(22) Filed: Oct. 4, 2024

(65) Prior Publication Data

US 2025/0123963 A1 Apr. 17, 2025

(30) Foreign Application Priority Data

Oct. 13, 2023 (TW) ................................ 112139162

(51) Int. Cl.
*G06F 12/02* (2006.01)

(52) U.S. Cl.
CPC ................................ *G06F 12/0246* (2013.01)

(58) Field of Classification Search
CPC .. G06F 12/0246; G06F 12/126; G06F 9/5038; G06F 13/18; G06F 3/061; G06F 3/0659; G06F 3/0679; G06F 2212/1016; G06F 2212/1024; G06F 2212/214; G06F 2212/312; G06F 2212/452; G06F 12/0866
USPC ................................................ 711/103, 151
See application file for complete search history.

(56) References Cited

U.S. PATENT DOCUMENTS

| | | | | |
|---|---|---|---|---|
| 2015/0378606 | A1* | 12/2015 | Huang | H04L 67/1004 711/103 |
| 2019/0227718 | A1* | 7/2019 | Frolikov | G06F 21/80 |
| 2019/0391928 | A1 | 12/2019 | Lin | |
| 2020/0104056 | A1* | 4/2020 | Benisty | G06F 3/0688 |
| 2021/0081325 | A1 | 3/2021 | Bradshaw | |
| 2022/0019533 | A1* | 1/2022 | La Fratta | G06F 12/0806 |
| 2023/0176731 | A1* | 6/2023 | Simionescu | G06F 12/124 |
| 2023/0237184 | A1 | 7/2023 | Shin | |
| 2024/0094928 | A1* | 3/2024 | Das | G06F 12/0246 |
| 2025/0094337 | A1* | 3/2025 | Sasaki | G06F 12/0246 |

FOREIGN PATENT DOCUMENTS

| | | | |
|---|---|---|---|
| TW | 201720123 | A | 6/2017 |
| TW | 202018514 | A | 5/2020 |
| TW | 202117544 | A | 5/2021 |
| WO | 2017040706 | A1 | 3/2017 |

* cited by examiner

*Primary Examiner* — Than Nguyen
(74) *Attorney, Agent, or Firm* — McClure, Qualey & Rodack, LLP

(57) ABSTRACT

A data storage device that performs instruction scheduling at the device side. The data storage device has a non-volatile memory, and a controller configured to operate the non-volatile memory in response to requests from the host side. The controller has an instruction cache operative to cache instructions issued from the host side. Based on information carried by the instructions, the controller schedules and executes the instructions to operate the non-volatile memory.

10 Claims, 13 Drawing Sheets

DATA STORAGE DEVICE AND CONTROL METHOD FOR NON-VOLATILE MEMORY

CROSS REFERENCE TO RELATED APPLICATIONS

This Application claims priority of Taiwan Patent Application No. 112139162, filed on Oct. 13, 2023, the entirety of which is incorporated by reference herein.

BACKGROUND OF THE INVENTION

Field of the Invention

The present invention relates to control technology for a data storage device.

Description of the Related Art

There are various forms of non-volatile memory (NVM) used for long-term data storage, such as flash memory, magnetoresistive random access memory (magnetoresistive RAM), ferroelectric RAM, resistive RAM, spin transfer torque-RAM (STT-RAM), and so on. These types of non-volatile memory may be used as the storage medium in a data storage device.

In this technical field, how to efficiently control non-volatile memory is an important issue.

BRIEF SUMMARY OF THE INVENTION

In this disclosure, instructions are cached on the device side to be scheduled for execution. The proposed data storage device has a non-volatile memory, and a controller coupled to the non-volatile memory. The controller is configured to operate the non-volatile memory in response to requests from the host side. The controller has an instruction cache operative to cache instructions issued from the host side. Based on information carried by the instructions, the controller schedules and executes the instructions to operate the non-volatile memory. The information carried by each instruction includes a namespace identifier and/or a function identifier. The different information combinations correspond to the different priority levels or processing bandwidths for the controller to schedule execution of the instructions.

The above concepts are also used to implement the control method of non-volatile memory.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

Figure 1:
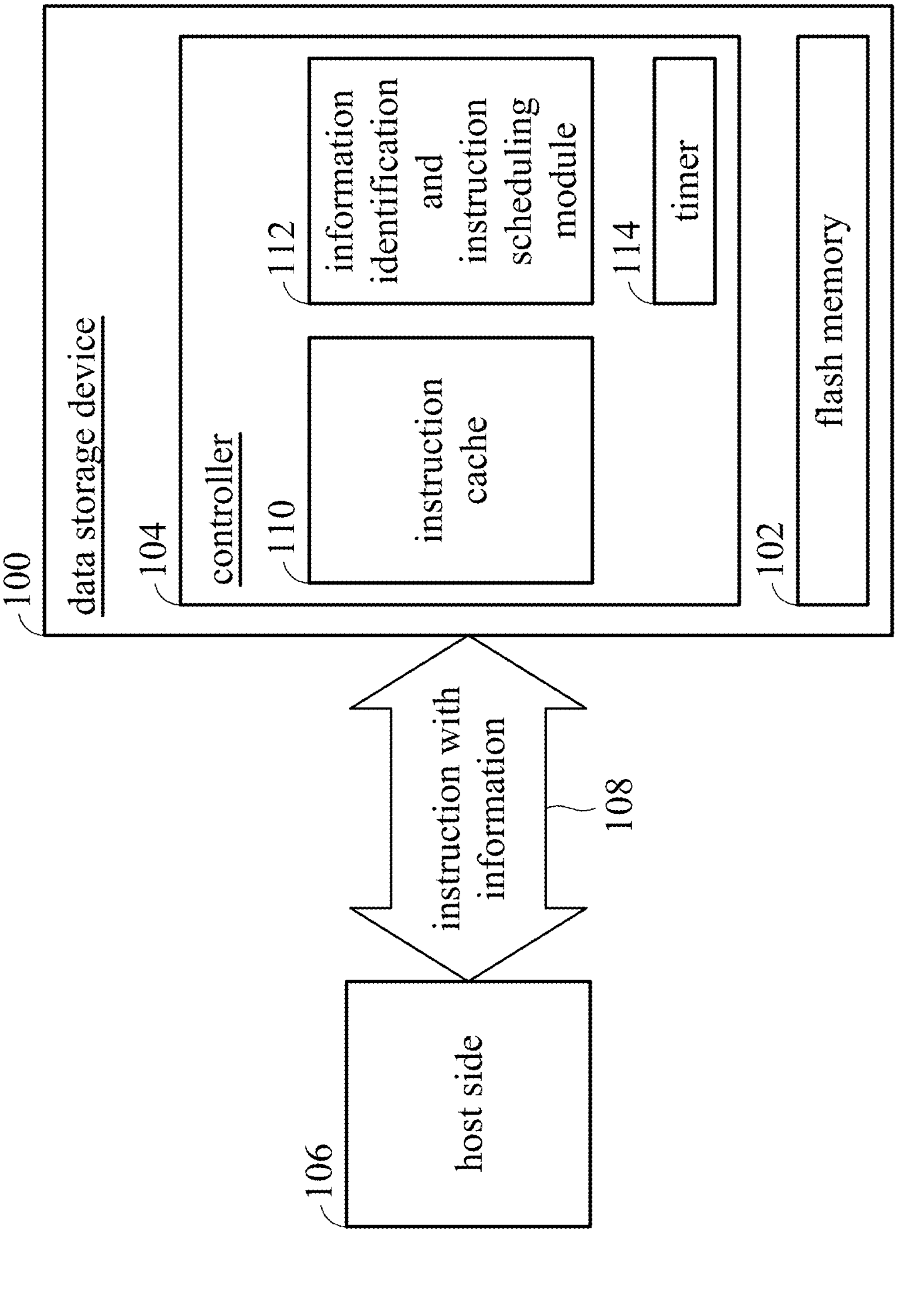
FIG. 1 illustrates a data storage device 100 in accordance with an exemplary embodiment of the disclosure.

The following description enumerates various embodiments of the disclosure, but is not intended to be limited thereto. The actual scope of the disclosure should be defined according to the claims. The various blocks/modules mentioned below may be implemented by a combination of hardware, software, and firmware, and may also be implemented by special circuits. The various blocks/modules are not limited to being implemented separately, but can also be combined together to share certain functions.

A non-volatile memory for long-term data retention may be a flash memory, a magnetoresistive random access memory (magnetoresistive RAM), a ferroelectric RAM, a resistive RAM, a spin transfer torque-RAM (STT-RAM) and so on. The following discussion uses flash memory as an example, but is not limited thereto. The proposed technology may be applied to the other types of non-volatile memory.

Today's data storage devices often use flash memory as the storage medium for storing user data from the host. There are many types of data storage devices, including memory cards, universal serial bus (USB) flash devices, solid-state drives (SSDs), and so on. In another exemplary embodiment, a flash memory may be packaged with a controller to form a multiple-chip package called eMMC (embedded multimedia card).

A data storage device using a flash memory as a storage medium can be applied in a variety of electronic devices, including a smartphone, a wearable device, a tablet computer, a virtual reality device, etc. A processor of an electronic device may be regarded as a host that operates the data storage device equipped on the electronic device to access the flash memory within the data storage device.

A data center may be built with data storage devices using flash memories as the storage medium. For example, a server may operate an array of SSDs to form a data center. The server may be regarded as a host that operates the SSDs to access the flash memories within the SSDs.

The vehicle-mounted device may also use a flash memory for data storage. Various sensors in the vehicle system each may be regarded as a host end, which has a need to access the flash memory.

A flash memory has its special storage characteristics. The host indicates logical addresses (for example, logical block address LBA or global host page number GHP, etc.) to issue read or write requests to the flash memory. The logical addresses need to be mapped to physical addresses of the physical space of the flash memory. The paper involves a namespace technology. Each namespace corresponds to a set of logical addresses and is only accessible to the particular software. Each namespace has its corresponding namespace identifier (NSID). A flash memory access instruction issued by the host may be accompanied with a namespace identifier (NSID) which will be recognized by the device controller.

In some exemplary embodiments, multiple host ends may share the same data storage device; for example, an in-vehicle system. A single root I/O virtualization (SRIOV) technology is proposed for high-speed peripheral component interconnection (PCIe) expansion. Referring to a virtual machine (VM) technology, a data storage device connected to a PCIe slot may be accessed via a physical channel or expanded virtual channels. The physical channel relates to a physical function, and the virtual channels relate to virtual functions (VFs). Each function corresponds to one virtual function (VF) identifier, which is abbreviated as VFID. For example, the physical function may be represented by a physical function identifier VFID0, and the virtual functions are numbered VFID1, VFID2, and so on. The flash memory access instruction issued by the host may be accompanied with its corresponding function identifier (VFID) to be recognized by the device controller.

In this disclosure, the instructions are cached on the device side to be scheduled and executes based on the information (such as the aforementioned namespace identifier NSID and/or function identifier VFID) carried by the instructions and, accordingly, the non-volatile memory operates.

FIG. 1 illustrates a data storage device 100 in accordance with an exemplary embodiment of the disclosure, which includes a flash memory 102 and a controller 104 coupled to the flash memory 102. The controller 104 is configured to operate the flash memory 102 as requested by the host side 106. The instruction 108 issued by the host side 106 carries information (such as the aforementioned namespace identifier NSID and/or function identifier VFID). The controller 104 uses the instruction cache 110 to cache the instruction 108 issued from the host side 106. The controller 104 further includes an information identification and instruction scheduling module 112, which schedules and executes the cached instructions according to their attached information, to operate the flash memory 102 accordingly. For example, the host 106 may assign the different priority levels or processing bandwidths to the different information combinations. In some exemplary embodiments, the priority level or processing bandwidth of each information combination may be assigned or set in the other ways, not limited to being assigned at the host side 106. As the setting of the host side 106, the information identification and instruction scheduling module 112 may schedule the instructions based on the identified information. The controller 104 may provide a timer 114 to implement the processing bandwidth control. In another exemplary embodiment, the processing bandwidth may be controlled by counting the executed instructions.

First, an instruction with namespace identifier (NSID) attached thereto is discussed as an example.

In an exemplary embodiment, the different namespace identifiers (NSIDs) correspond to the different priority levels. The controller 104 on the device side preferentially executes the instructions with the higher priority NSIDs in the instruction cache 100, and then executes the instructions with the lower priority NSIDs in the instruction cache 100.

Figure 2A:
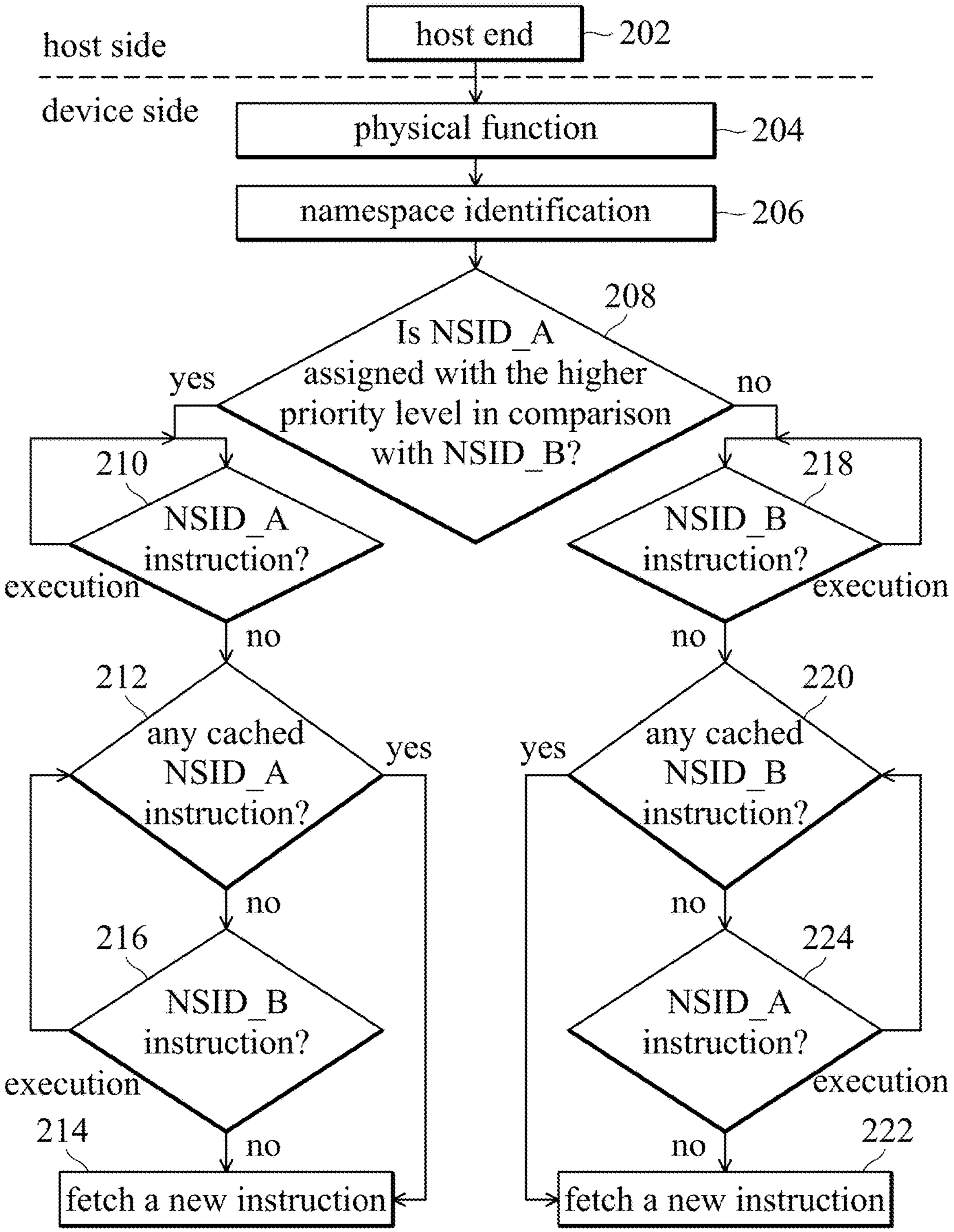
FIGS. 2A and 2B illustrate a non-SRIOV example with a single host end 202.
Figure 2B:
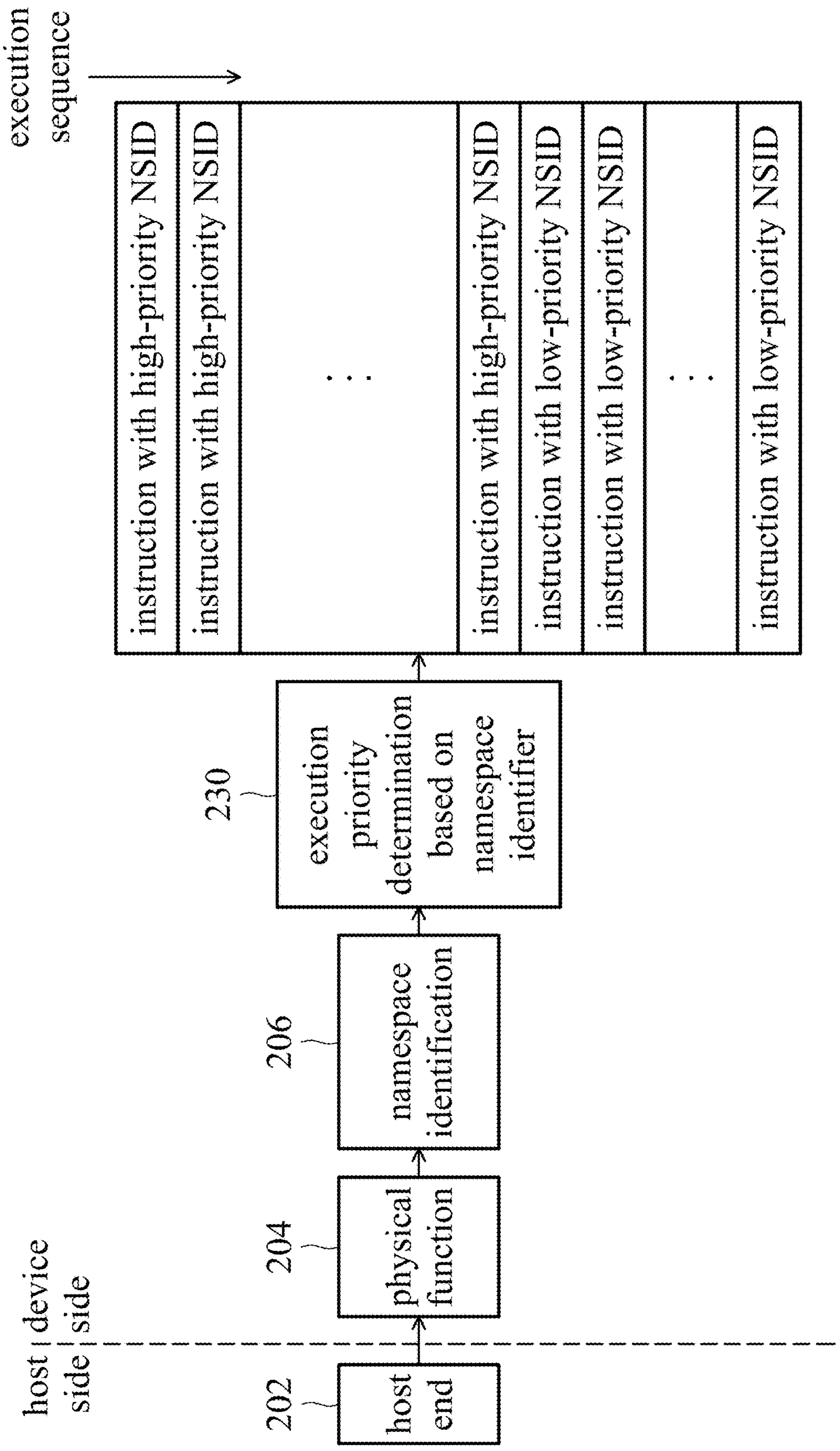

FIGS. 2A and 2B illustrate a non-SRIOV example with a single host end 202.

Referring to FIG. 2A, the host end 202 issues instructions to the device to implement a physical function 204. The instructions are cached, scheduled, and then executed. Each instruction carries information comprising a namespace identifier (NSID) related to the instruction. The different namespace identifiers (NSIDs) correspond to the different execution priority levels. In this exemplary embodiment, two different priority levels are assigned to two namespace identifiers NSID_A and NSID_B. The device first operates the functional block 206 to identify the namespace of the cached instructions. Then, the device operates the functional block 208 to determine whether the namespace identifier NSID_A is assigned with the higher priority level in comparison with the priority level assigned to the namespace identifier NSID_B. If so, the device operates the functional block 210 to determine whether the processing instruction relates to the namespace identifier NSID_A. If so, the device executes the instruction and operates the functional block 210 again to determine whether the next instruction also relates to the namespace identifier NSID_A. The device can operate the functional block 212 to determine whether any instruction with the namespace identifier NSID_A is cached in the other space of the instruction cache 110. If so, the device operates the functional block 214 to fetch a new instruction with the namespace identifier NSID_A from the instruction cache 110, and returns to the aforementioned steps to execute the instruction according to its execution priority. If the instruction cache 110 does not cache any instruction with namespace identifier NSID_A, the device operates the functional block 216 to determine whether the processing instruction relates to another namespace identifier NSID_B. If so, the device executes the instruction and operates the functional block 212 to check the instruction cache 110 to ensure that the instructions with the namespace number NSID_A have the higher execution priority. If the functional block 216 determines that neither instruction with namespace identifier NSID_A nor instruction with namespace identifier NSID_B can be processed, the device operates the functional block 214 to fetch a new instruction from the instruction cache 110, and then returns to the former steps to schedule the execution of the newly-fetched instruction based on its execution priority.

If the functional block 208 determines that the namespace identifier NSID_A is not assigned with the higher priority, it means that the namespace identifier NSID_B relates to the higher priority. The device operates the functional block 218 to determine whether the processing instruction relates to the namespace identifier NSID_B. If so, the device executes the instruction and operates the functional block 218 again to determine whether the next instruction also relates to the namespace identifier NSID_B. The device can operate functional block 220 to determine whether there is any instruction with namespace identifier NSID_B cached in the other space of the instruction cache 110. If so, the device operates the functional block 222 to fetch a new instruction with namespace identifier NSID_B from the instruction cache 110, and returns to the former steps to execute the fetched instruction according to its execution priority. If the instruction cache 110 does not cache any instruction with namespace identifier NSID_B, the device operates the functional block 224 to determine whether it is processing an instruction with namespace identifier NSID_A. If so, the device executes the instruction and operates the functional block 220 to check the instruction cache 110 to ensure that the instruction with the namespace identifier NSID_B is executed in the higher priority. If the functional block 224 determines that neither instruction with namespace identifier NSID_B nor instruction with namespace identifier NSID_A can be processed, the device operates the functional block 222 to fetch a new instruction from the instruction cache 110, then returns to the former steps to schedule its execution according to its execution priority.

Referring to FIG. 2B, the instruction issued by the host 202 is translated to a physical function (204) with the recognized namespace identifier (206), and then its execution priority is determined based on its namespace identifier (230, corresponding to some functional blocks in FIG. 2A). As shown, the instructions with the high-priority NSID are executed first, and then the instructions with the low-priority NSID are executed.

Figure 3A:
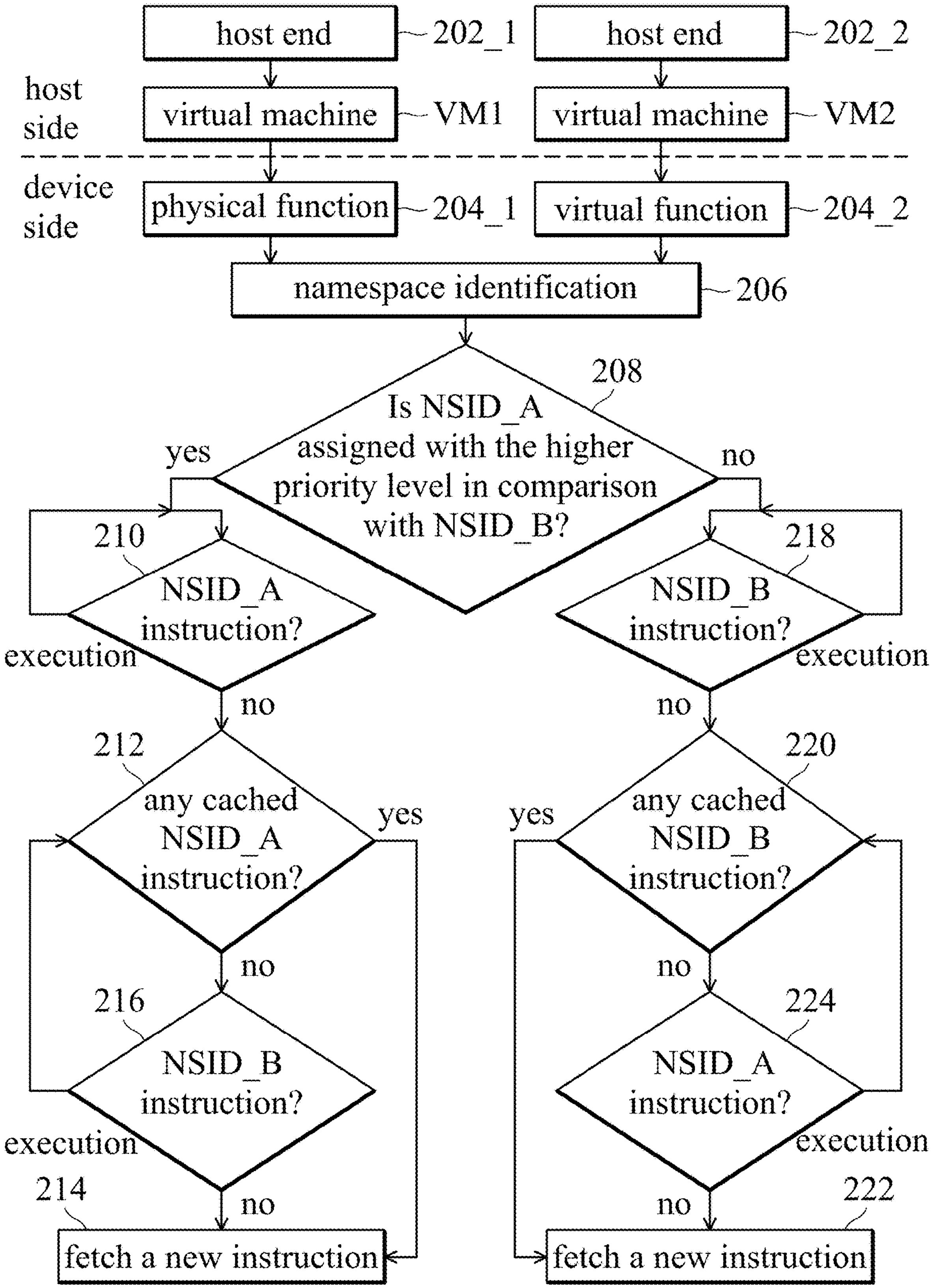
FIGS. 3A and 3B illustrate an SRIOV example with multiple host ends.
Figure 3B:
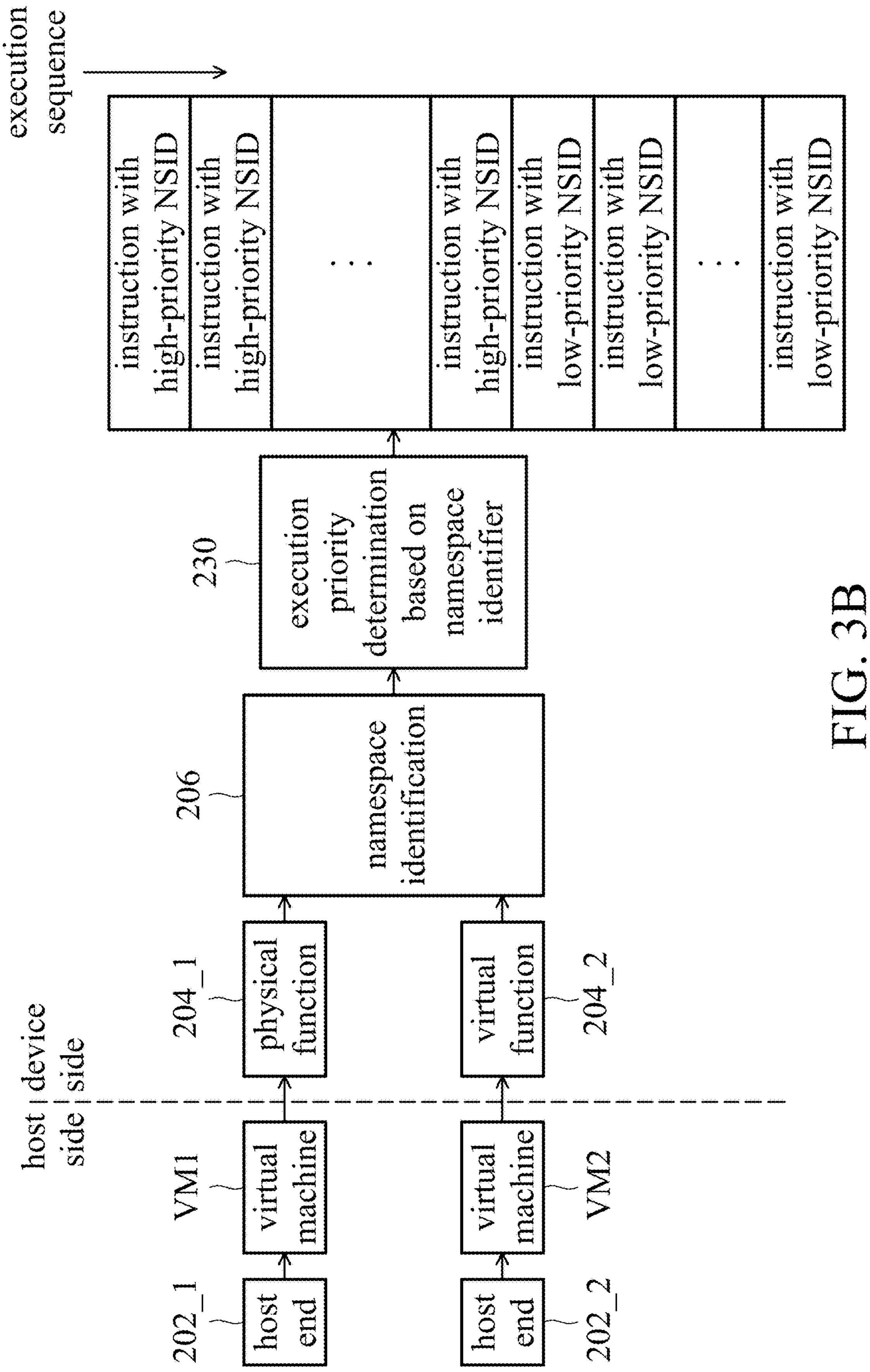

FIGS. 3A and 3B illustrate an SRIOV example with multiple host ends.

Compared with the single host end 202 in FIG. 2A, the two host ends 202_1 and 202_2 in FIG. 3A respectively issue instructions to the device through two virtual machines VM1 and VM2, to implement a physical function 204_1 and a virtual function 204_2 at the device side. The remaining functional blocks in FIG. 3A are the same as those in FIG. 2A. With respect to FIG. 3A, FIG. 3B shows that in the SRIOV example, the instructions with the high-priority NSID are executed first, and then the instructions with the low-priority NSID are executed.

In an exemplary embodiment, instructions with the different namespace identifiers (NSIDs) correspond to the different processing bandwidths.

During the first time interval T1, the controller 104 prioritizes the execution of instructions cached in the instruction cache 110 and related to a first namespace identifier. During the second time interval T2, the controller 104 prioritizes the execution of instructions cached in the instruction cache 110 and related to a second namespace identifier. In an exemplary embodiment, the controller 104 on the device side divides an execution cycle into the first time interval T1 and the second time interval T2 which have the different lengths. Alternatively, two time intervals planned in a way irrelevant to dividing an execution cycle may also be used as the first time interval T1 and the second time interval T2.

Figure 4A:
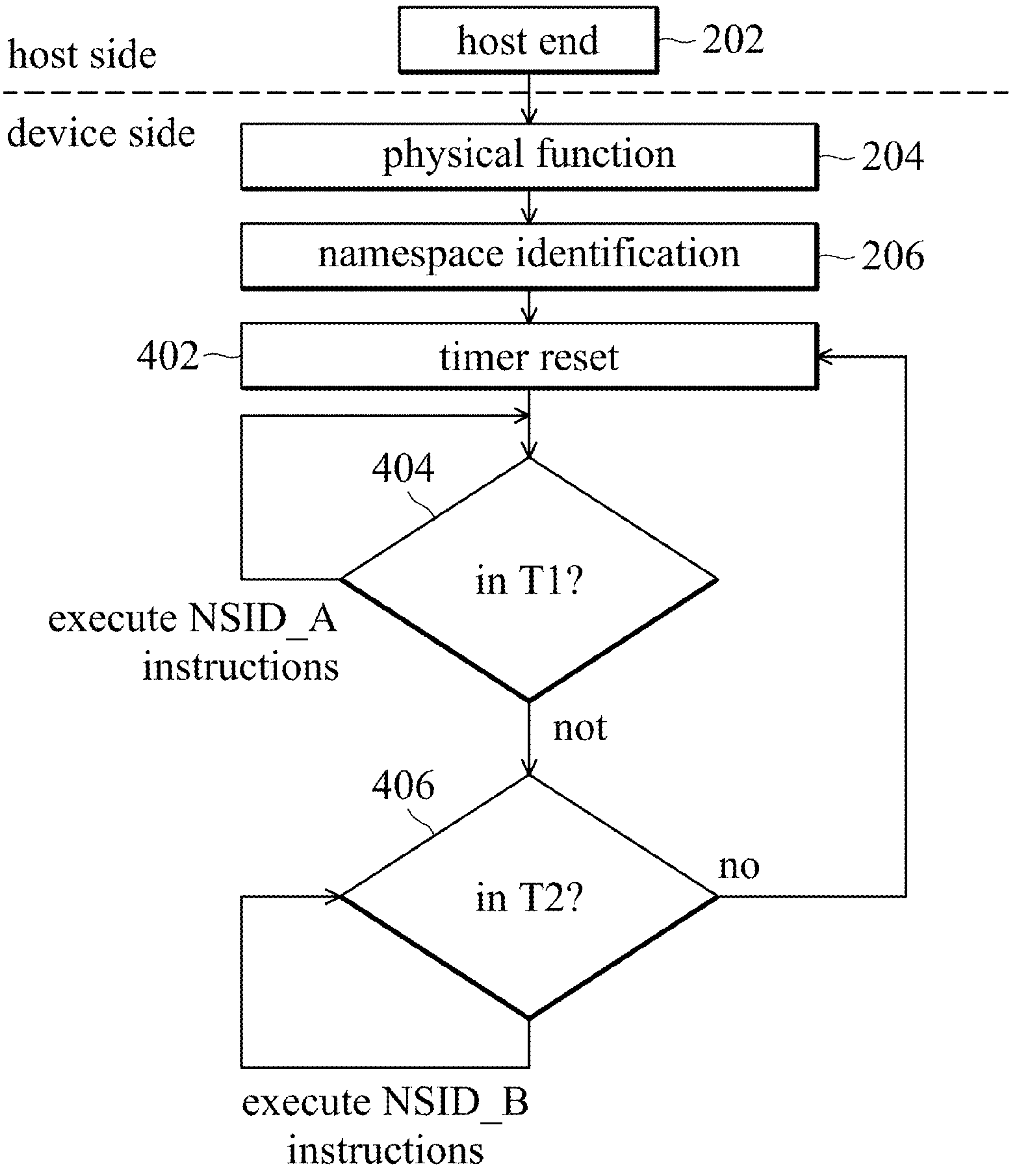
FIGS. 4A and 4B illustrate a non-SRIOV example with a single host end 202.
Figure 4B:
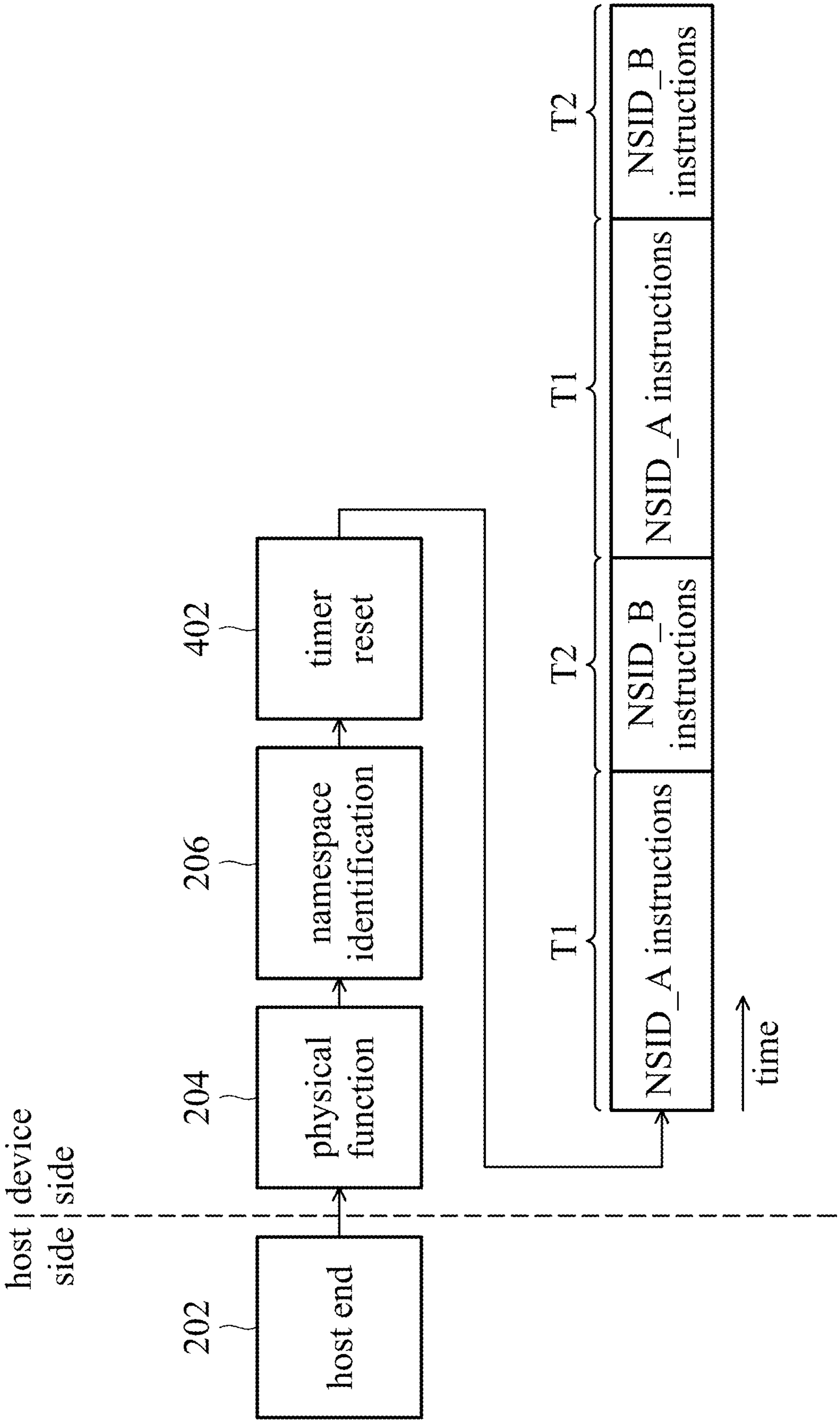

FIGS. 4A and 4B illustrate a non-SRIOV example with a single host end 202.

Referring to FIG. 4A, the host 202 issues instructions to the device end to implement a physical function 204. Each instruction carries information that shows a namespace identifier (NSID) related to the instruction. The different namespace identifiers (NSIDs) correspond to the different processing bandwidths. In the exemplary embodiment, the processing bandwidth assigned to the namespace identifier NSID_A is greater than the processing bandwidth assigned to the namespace identifier NSID_B. At the device side, the functional block 206 operates to identify the namespace, and then the functional block 402 reset the timer 114. Next, the functional block 404 at the device side monitors the timer 114 to identify the first time interval T1. During the first time interval T1, the device executes the instructions of the namespace identifier NSID_A till the end of the first time interval T1. Next, the functional block 406 at device side checks the timer 114 to identify the second time interval T2 (shorter than the first time interval T1). During the second time interval T2, the device executes the instructions of the namespace identifier NSID_B till the end of the second time interval T2. After the second time interval T2, the functional block 402 operates to reset the timer 114.

Referring to FIG. 4B, the instructions issued by the host end 202 is translated to a physical function (204), and its related namespace is recognized (206). At the device side, the functional block 402 operates to reset the timer 114 periodically, to determine the first time interval T1 (for execution of instructions with the namespace identifier NSID_A) and the second time interval T2 (for execution of instructions with the namespace identifier NSID_B) over and over. The figure shows that the first time interval T1 is longer than the second time interval T2. Instructions with namespace identifier NSID_A gains the greater processing bandwidth than instructions with namespace identifier NSID_B.

Figure 5A:
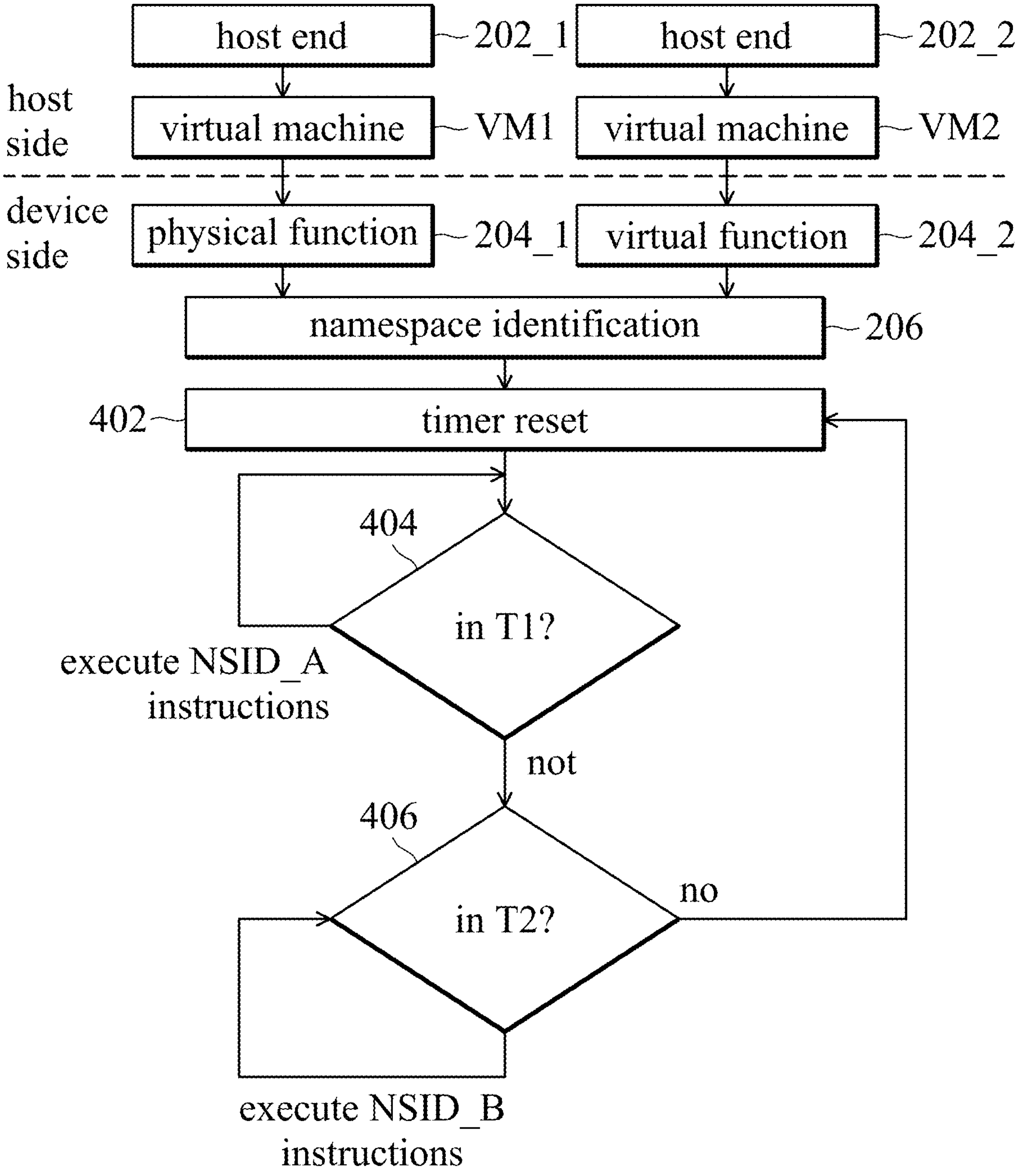
FIGS. 5A and 5B illustrate an SRIOV example with multiple host ends.
Figure 5B:
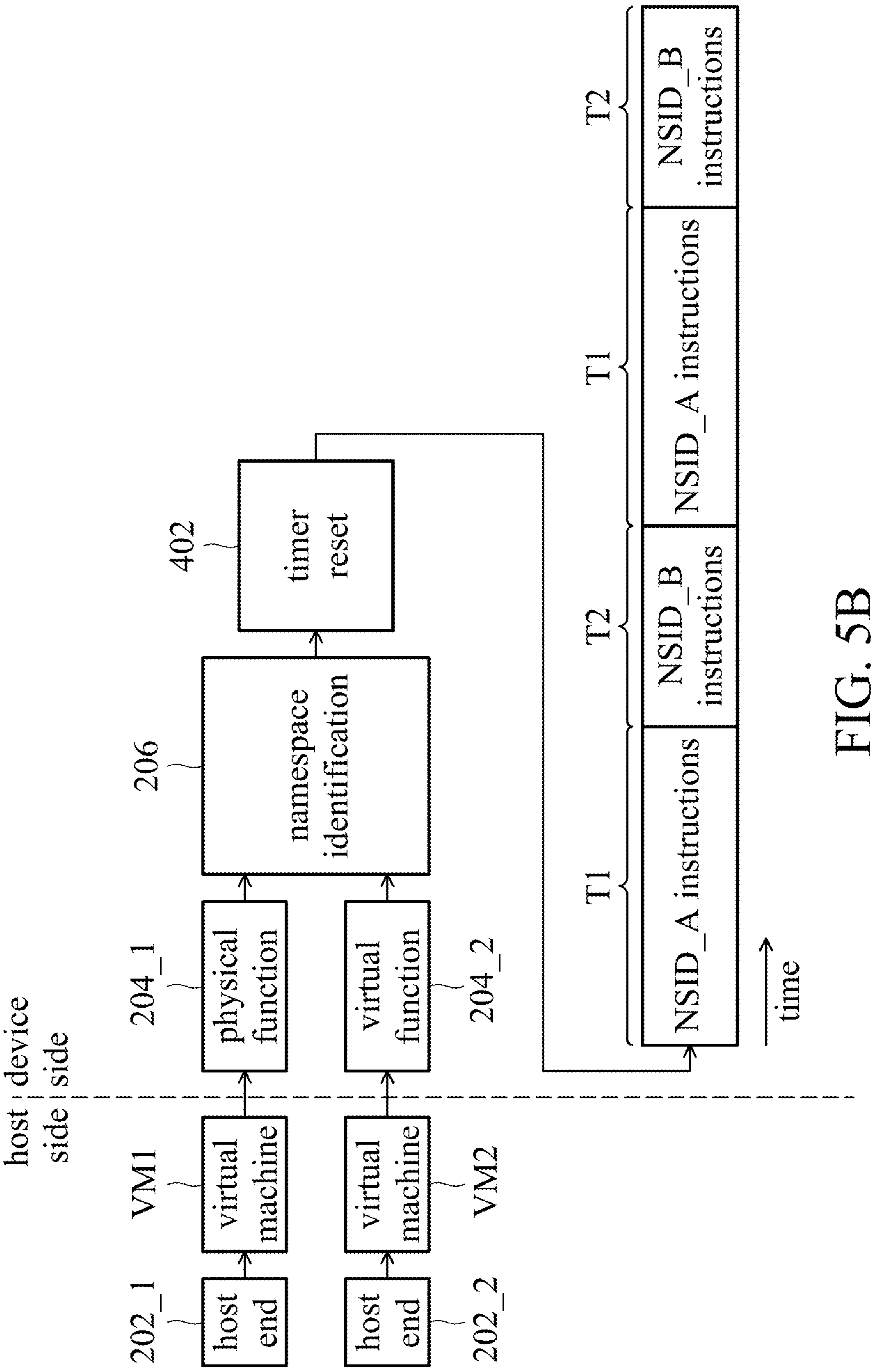

FIGS. 5A and 5B illustrate an SRIOV example with multiple host ends.

Compared with the single host end 202 in FIG. 4A, the two host ends 202_1 and 202_2 in FIG. 5A respectively operate two virtual machines VM1 and VM2 to issue instructions to the storage device, to implement a physical function 204_1 and a virtual function 204_2 at the device side. The remaining functional blocks in FIG. 5A are the same as those in FIG. 4A. With respect to FIG. 5A, FIG. 5B shows that the SRIOV example also makes the instructions with namespace identifier NSID_A to gain the greater processing bandwidth than the instructions with namespace identifier NSID_B. As shown, the first time interval T1 is longer than the second time interval T2.

In some situations, there is no instruction with namespace identifier NSID_A although the first time interval T1 has not expired. At this moment, the controller 104 is allowed to execute the instructions with namespace identifier NSID_B. Similarly, if the second time interval T2 has not expired, but there is no instruction with namespace identifier NSID_B to be executed, the controller 104 can execute the instruction with namespace identifier NSID_A.

In an exemplary embodiment, the device-side controller 104 monitors the number of executed instructions to adjust the processing bandwidth. The controller 104 is configured to make the namespace identifier NSID_A to correspond to an instruction amount N1, and to make the namespace identifier NSID_B to correspond to an instruction amount N2, where N1 #N2. The controller 104 is scheduled to execute N1 NSID_A instructions and then to execute N2 NSID_B instructions. The N1: N2 cycles are repeated. If N1 is greater than N2, the instructions with namespace identifier NSID_A gains the greater processing bandwidth than the instructions with namespace identifier NSID_B.

In an exemplary embodiment, the device-side controller 104 controls the bottom limit of the remained cached instructions to control the processing bandwidth. The controller 104 is configured to make the namespace identifier NSID_A to correspond to a bottom limit TH1, and the namespace identifier NSID_B to correspond to a bottom limit TH2, where TH1≠TH2. The controller 104 executes the instructions with namespace identifier NSID_A till the remained cached instructions with namespace identifier NSID_A drops to the bottom limit TH1, and then changes to execute the instructions with namespace identifier NSID_B. The execution of the instructions with namespace identifier NSID_B continues till the remained cached instructions with namespace identifier NSID_B drops to the bottom limit TH2, and then the controller 104 changes to execute the instructions with namespace identifier NSID_A, and cycles like this. If TH1 is smaller than TH2, the instructions with namespace identifier NSID_A gains the greater processing bandwidth than the instructions with namespace identifier NSID_B.

The following discusses examples wherein function identifiers (VFID) are used as the information attached to the instructions. Such embodiments are SRIOV applications.

In an exemplary embodiment, the instructions with the different VFIDs are at the different priority levels. The controller 104 on the device side preferentially executes the instructions cached in the instruction cache 110 and related to the higher-priority VFID, and then executes the instructions cached in the instruction cache 110 and related to the lower-priority VFID.

Figure 6A:
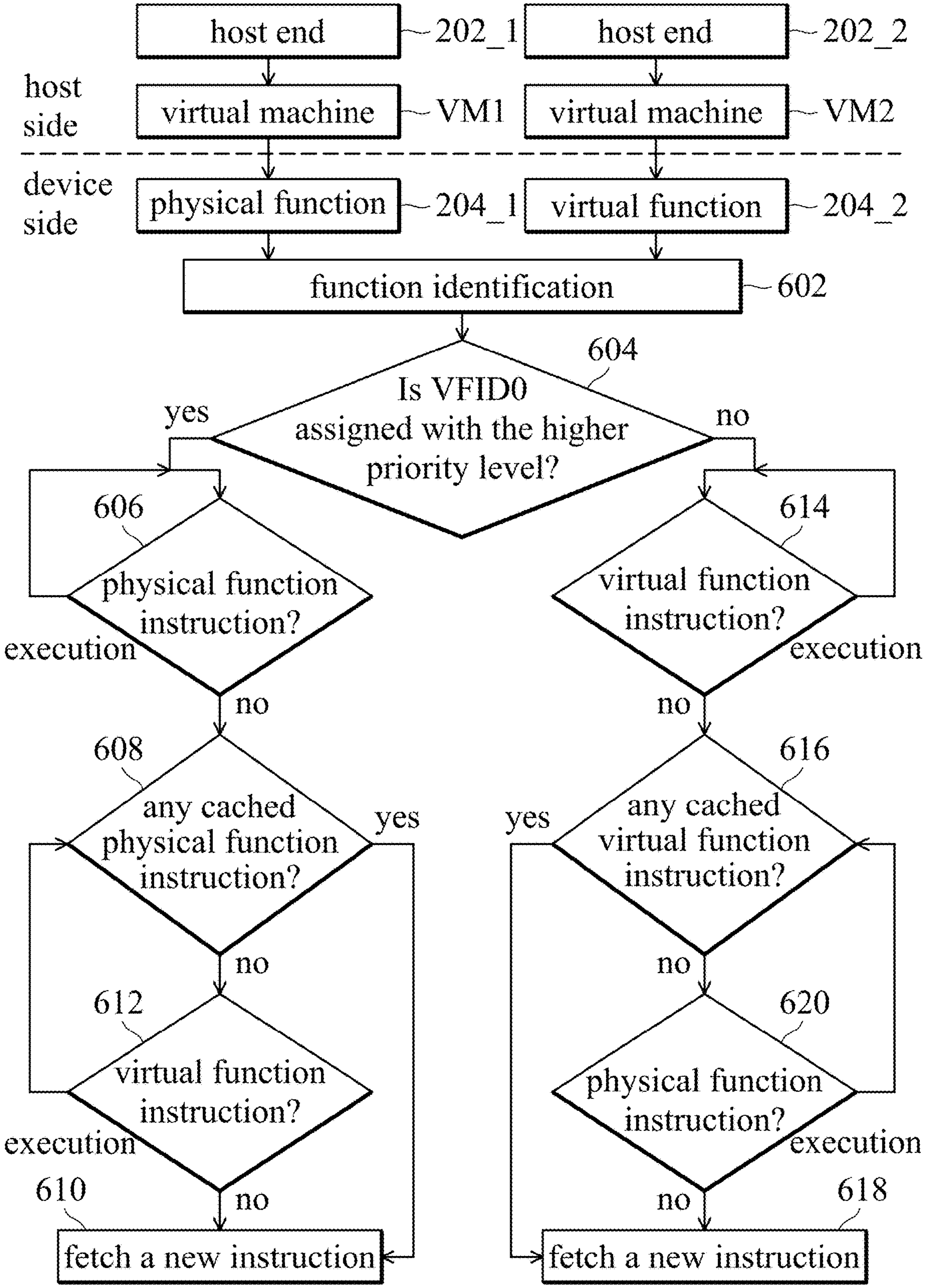
FIGS. 6A and 6B illustrate a non-SRIOV example with multiple host ends 202_1 and 202_2.
Figure 6B:
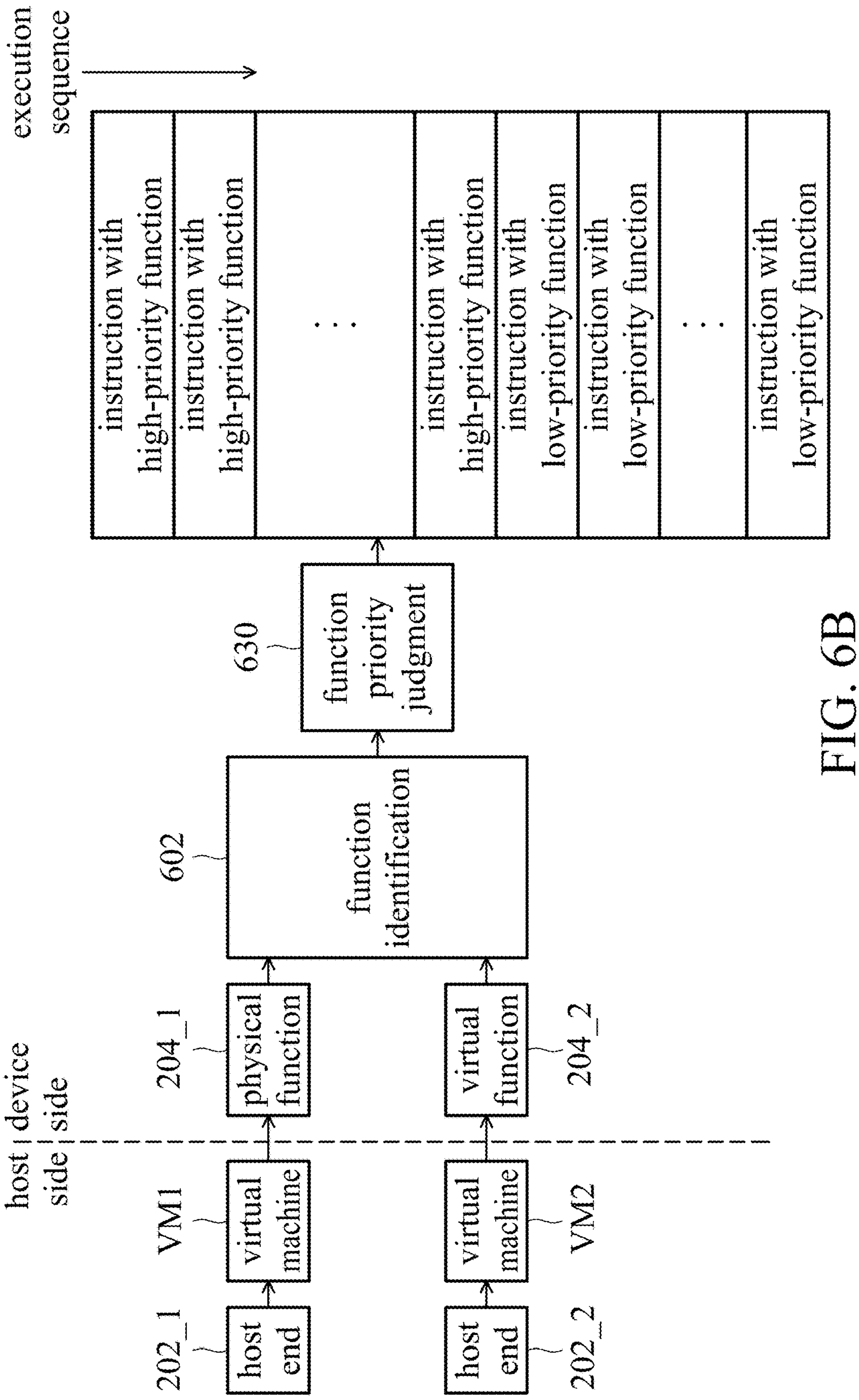

FIGS. 6A and 6B illustrate a non-SRIOV example with multiple host ends 202_1 and 202_2.

Referring to FIG. 6A, the two host ends 202_1 and 202_2 respectively operate two virtual machines VM1 and VM2 to issue instructions to the device side, to implement the physical function 204_1 and the virtual function 204_2 at the device side. Each instruction carries information about VFID which is defined for device virtualization. The priority of each VFID may be defined at the host side. For example, this embodiment prioritizes two VFIDs (VFID0 corresponding to the virtual machine VM1, and VFID1 corresponding to the virtual machine VM2). At the device side, after the functional block 602 performs function identification, the functional block 604 determines whether the physical function with the function identifier VFID0 is granted the higher priority. If so, the device operates the functional block 606 to determine whether the processing instruction is a physical function instruction with VFID0. If so, the device executes the instruction and operates the functional block 606 again to determine whether the next instruction is also a physical function instruction with VFID0. Otherwise, the device may operate the functional block 608 to determine whether any physical function instructions with VFID0 are cached in the other space of the instruction cache 110. If so, the device operates the functional block 610 to fetch a new physical function instruction with VFID0 from the instruction cache 110, and returns to the former steps to execute it according to the priority rule. If the instruction cache 110 currently does not have any physical function instruction of VFID0, the device operates the functional block 612 to determine whether the processing instruction is a virtual function instruction with VFID1. If so, the device executes the instruction and operates functional block 608 to check the instruction cache 110 to ensure that the physical function instructions with VFID0 take priority over the virtual function instructions with VFID1. If the functional block 612 determines that neither physical function instructions with VFID0 nor virtual function instructions with VFID1 can be processed, the device operates the functional block 610 to fetch a new instruction from the instruction cache 110, and then returns to the former steps to schedule its execution according to its priority level.

If the functional block 604 determines that the physical function (VFID0) is not granted the higher priority, it means that the virtual function (VFID1) corresponds to the higher priority. At the device side, the functional block 614 determines whether the processing instruction is a virtual function instruction with VFID1. If so, the device executes the instruction and operates the functional block 614 again to determine whether the next instruction is also a virtual function instruction with VFID1. Otherwise, the device may operate the functional block 616 to determine whether any virtual function instruction with VFID1 is cached in the remaining space of the instruction cache 110. If so, the device operates the functional block 618 to fetch a new virtual function instruction with VFID1 from the instruction cache 110, and returns to the former steps to execute it according to its priority level. If the instruction cache 110 currently does not have any virtual function instruction with VFID1, the device operates the functional block 620 to determine whether the processing instruction is a physical function instruction with VFID0. If so, the device executes the instruction and operates the functional block 616 to check the instruction cache 110 to ensure that the virtual function instructions with VFID1 take priority over the physical function instructions with VFID0. If the functional block 620 determines that neither physical function instructions with VFID0 nor virtual function instructions with VFID1 can be processed, the device operates the functional block 618 to fetch a new instruction from the instruction cache 110, then returns to the former steps to schedule its execution according to its priority level.

Referring to FIG. 6B, the instructions issued by the host end 202_1/202_2 are translated to the physical function 204_1/virtual function 204_2, and after completing the function identification (602), the function priority judgment is made (630, corresponding to those functional blocks in FIG. 6A). As shown in the figure, the instructions with the higher-priority VFID are executed first, and then the instruction with the lower-priority VFID are executed.

In an exemplary embodiment, instructions with the different VFIDs correspond to the different processing bandwidths.

During the first time interval T1, the controller 104 prioritizes executing instructions cached in the instruction cache 110 and related to a first function identifier. During the second time interval T2, the controller 104 prioritizes executing instructions cached in the instruction cache 110 and related to a second function identifier. In an exemplary embodiment, the controller 104 on the device side divides an execution cycle into the first time interval T1 and the second time interval T2 which have the different lengths. Alternatively, two time intervals planned in a way irrelevant to dividing an execution cycle may also be used as the first time interval T1 and the second time interval T2.

Figure 7A:
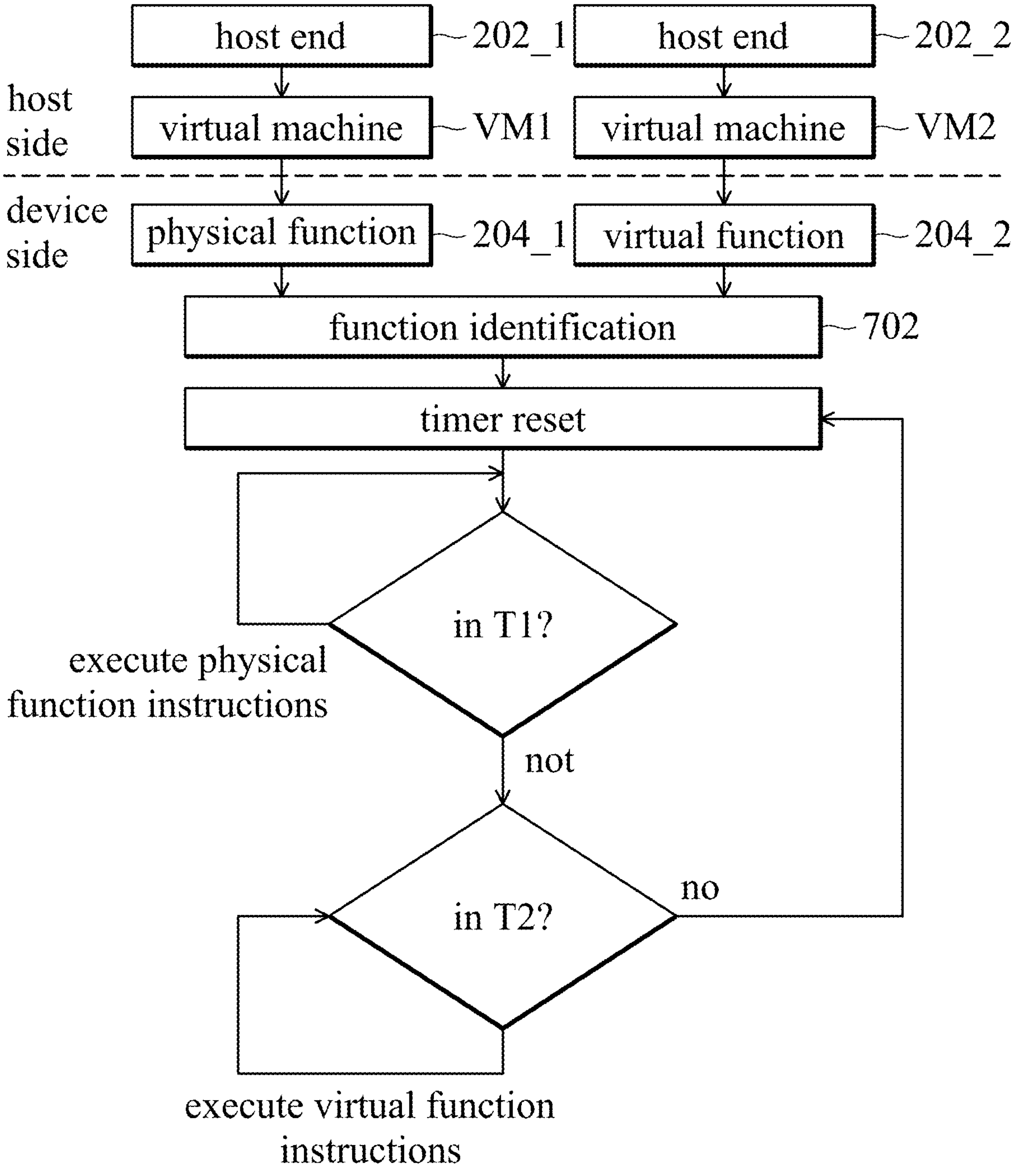
FIGS. 7A and 7B illustrate an SRIOV example with multiple host ends 202_1 and 202_2.
Figure 7B:
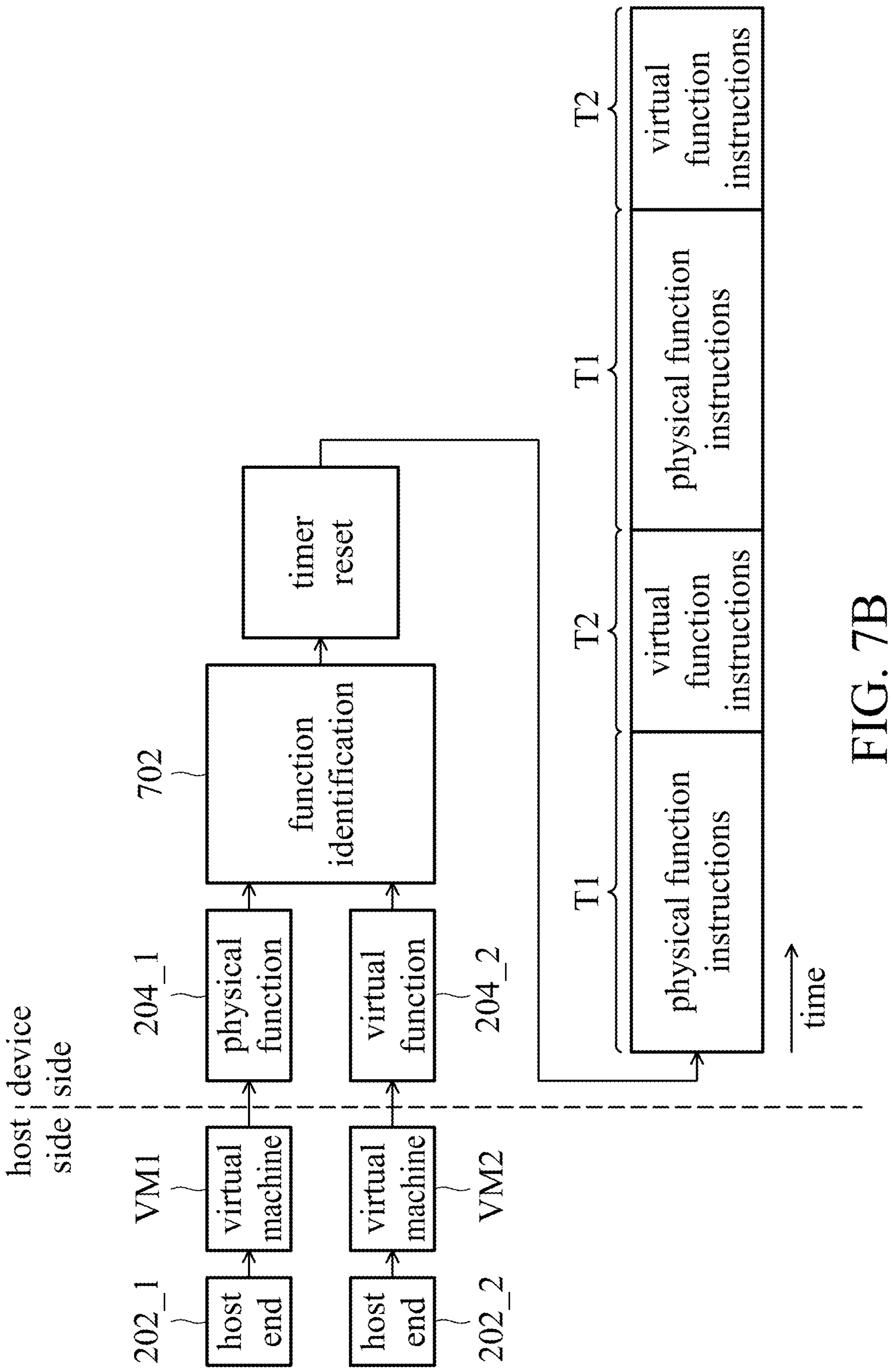

FIGS. 7A and 7B illustrate an SRIOV example with multiple host ends 202_1 and 202_2.

Compared with the examples of FIGS. 5A and 5B in which the bandwidth is planned according to namespace, a functional block 702 of function identification is introduced in FIGS. 7A and 7B. FIG. 7B clearly shows that the physical function instruction with function identifier VFID0 gains greater processing bandwidth than the virtual function instruction with function identifier VFID1.

In some situations, there are no instructions with function identifier VFID0 although the first time interval T1 has not expired. At this moment, the controller 104 is allowed to execute the instructions with function identifier VFID1. Similarly, if the second time interval T2 has not expired, but there are no instructions with function identifier VFID1 to be executed, the controller 104 can execute the instruction with function identifier VFID0.

In an exemplary embodiment, the device-side controller 104 monitors the number of executed instructions to adjust the processing bandwidth. The controller 104 is configured to make the function identifier VFID0 to correspond to an instruction amount N1, and to make the function identifier VFID1 to correspond to an instruction amount N2, where N1 #N2. The controller 104 is scheduled to execute N1 VFID0 instructions and then to execute N2 VFID1 instructions. The N1: N2 cycles are repeated. If N1 is greater than N2, the instructions with function identifier VFID0 gains the greater processing bandwidth than the instructions with function identifier VFID1.

In an exemplary embodiment, the device-side controller 104 controls the bottom limit of the remained cached instructions to control the processing bandwidth. The controller 104 is configured to make the function identifier VFID0 to correspond to a bottom limit TH1, and the function identifier VFID1 to correspond to a bottom limit TH2, where TH1≠TH2. The controller 104 executes the instructions with function identifier VFID0 till the remained cached instructions with function identifier VFID0 drops to the bottom limit TH1, and then changes to execute the instructions with function identifier VFID1. The execution of the instructions with function identifier VFID1 continues till the remained cached instructions with function identifier VFID1 drops to the bottom limit TH2, and then the controller 104 changes to execute the instructions with function identifier VFID0, and cycles like this. If TH1 is smaller than TH2, the instructions with function identifier VFID0 gains the greater processing bandwidth than the instructions with function identifier VFID1.

In other exemplary embodiments, the priority level/processing bandwidth plan is not limited to schedule a physical function and a virtual function. The different priority levels/processing bandwidths may be assigned to the different virtual functions. For example, the first virtual function may correspond to a priority level/processing bandwidth different from that of the second virtual function.

The above concept may be used to implement a non-volatile memory control method, including: caching a plurality of instructions which are issued from the host side to operate a non-volatile memory; and, scheduling and executing the instructions according to information attached to the instructions, to operate the non-volatile memory accordingly. These instructions are used to operate the non-volatile memory. This information may be a namespace identifier (NSID) or/and a function identifier (VFID). Different combinations of these identifiers may correspond to the different priority levels or processing bandwidths for command scheduling.

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A data storage device, comprising:

a non-volatile memory; and a controller, coupled to the non-volatile memory, and configured to operate the non-volatile memory in response to requests from host side, wherein;

the controller has an instruction cache, operative to cache instructions issued from the host side;

based on information carried by the instructions, the controller schedules and executes the instructions to operate the non-volatile memory; and the information carried by each instruction, for the controller at device side to perform instruction scheduling, includes a namespace identifier, and each namespace identifier corresponds to a set of logical addresses, and at the host side, logical addresses are applied to make access requests to the non-volatile memory.

2. The device as claimed in claim 1, wherein:

the different namespace identifiers correspond to the different priority levels; and the controller first executes instructions with a higher priority namespace identifier in the instruction cache before executing instructions with a lower priority namespace identifier in the instruction cache.

3. The device as claimed in claim 1, wherein the different namespace identifiers correspond to the different processing bandwidths.

4. The device as claimed in claim 3, wherein:

during a first time interval, the controller prioritizes executing instructions with a first namespace identifier in the instruction cache; and during a second time interval, the controller prioritizes executing instructions with a second namespace identifier in the instruction cache.

5. The device as claimed in claim 1, wherein:

the information carried by each instruction further includes a namespace identifier as well as a function identifier defined for device virtualization; and each namespace identifier corresponds to a set of logical addresses, and at the host side, logical addresses are applied to make access requests to the non-volatile memory; and the different information combinations of the namespace identifier and the function identifier correspond to the different priority levels or processing bandwidths for the controller to schedule execution of the instructions.

6. A non-volatile memory control method, comprising:

caching instructions at a device side, wherein the instructions are issued from a host side; and based on information carried by the instructions, scheduling and executing the instructions to operate a non-volatile memory at the device side wherein:

the information carried by each instruction, for instruction scheduling at the device side, includes a namespace identifier; and each namespace identifier corresponds to a set of logical addresses, and at the host side, logical addresses are applied to make access requests to the non-volatile memory.

7. The non-volatile memory control method as claimed in claim 6, further comprising:

assigning the different priority levels to the different namespace identifiers; and executing instructions with a higher priority namespace identifier in the instruction cache before executing instructions with a lower priority namespace identifier in the instruction cache.

8. The non-volatile memory control method as claimed in claim 6, further comprising:

assigning the different processing bandwidths to the different namespace identifiers.

9. The non-volatile memory control method as claimed in claim 8, further comprising:

prioritizing executing instructions with a first namespace identifier in the instruction cache during a first time interval; and prioritizing executing instructions with a second namespace identifier in the instruction cache during a second time interval.

10. The non-volatile memory control method as claimed in claim 6, wherein:

the information carried by each instruction further includes a namespace identifier as well as a function identifier defined for device virtualization; and each namespace identifier corresponds to a set of logical addresses, and at the host side, logical addresses are applied to make access requests to the non-volatile memory; and the different information combinations of the namespace identifier and the function identifier correspond to the different priority levels or processing bandwidths for scheduling execution of the instructions.

* * * * *